United States Patent
Guo et al.

(10) Patent No.: US 11,734,145 B2
(45) Date of Patent: Aug. 22, 2023

(54) COMPUTATION OF AFTER-HOURS ACTIVITIES METRICS

(71) Applicant: Microsoft Technology Licensing, LLC, Redmond, WA (US)

(72) Inventors: Wendy Guo, Edmonds, WA (US); Nagendra Kalyan Nanduru, Redmond, WA (US); Siqi Yang, Kirkland, WA (US); Feng Zhang, Suzhou (CN); Vivek Chauhan, Bellevue, WA (US); Vineet Batta, Bothell, WA (US); Leanna Holly Robb, Seattle, WA (US); Bichong Li, Suzhou (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 521 days.

(21) Appl. No.: 16/885,674

(22) Filed: May 28, 2020

(65) Prior Publication Data
US 2021/0374030 A1 Dec. 2, 2021

(51) Int. Cl.
*G06F 11/34* (2006.01)
*G06Q 10/1091* (2023.01)

(52) U.S. Cl.
CPC ...... *G06F 11/3438* (2013.01); *G06F 11/3419* (2013.01); *G06Q 10/1091* (2013.01)

(58) Field of Classification Search
CPC ........ G06F 17/18; G01V 1/288; G01V 1/008; G06K 9/6267; G06N 3/08
See application file for complete search history.

(56) References Cited

U.S. PATENT DOCUMENTS

| | | | |
|---|---|---|---|
| 8,869,053 B2 | 10/2014 | Ehrler et al. | |
| 2007/0162432 A1* | 7/2007 | Armstrong | H04L 67/306 |
| 2012/0065932 A1 | 3/2012 | Catipon et al. | |
| 2015/0081487 A1 | 3/2015 | Porter et al. | |
| 2015/0178790 A1* | 6/2015 | Yi | G06Q 30/0202 |
| | | | 705/14.69 |
| 2017/0116552 A1 | 4/2017 | Deodhar et al. | |
| 2017/0357660 A1* | 12/2017 | Damgaard Husted | |
| | | | G06Q 30/0277 |
| 2018/0225617 A1 | 8/2018 | Leung et al. | |
| 2019/0074090 A1 | 3/2019 | Ronen | |

OTHER PUBLICATIONS

"After-Hours Email Expectations Negatively Impact Employee Well-Being", In ScienceDaily, Jul. 27, 2016, 4 Pages.
(Continued)

*Primary Examiner* — Elias Desta
(74) *Attorney, Agent, or Firm* — Schwegman Lundberg & Woessner, P.A.

(57) ABSTRACT

A system and method for computing a metric indicating a user operation of an application is described. The system accesses online activity data of a user operation of the application. The system filters the online activity data based on a preset time range. An after-hours activity score is calculated based on a type of activity or a duration of an activity from the filtered online activity data, and a weight assigned to the type of activity or the duration of the activity. The system computes an after-hours metric based on the after-hours activity score. A configuration setting for the application based on the after-hours metric is applied to the application.

20 Claims, 10 Drawing Sheets

(56) References Cited

OTHER PUBLICATIONS

"How After-Hours Emails Might Hurt Your Health", Retrieved from: https://www.psychologicalscience.org/news/minds-business/how-afterhours-emails-might-hurt-your-health.html, Jan. 10, 2017, 2 Pages.

Dehmer, Michele, "Wellbeing", Retrieved from: https://docs.microsoft.com/en-us/workplace-analytics/myanalytics/use/wellbeing#about-the-metrics, Mar. 16, 2020, 2 Pages.

Ferrari-Herrmann, Eric, "The Best Apps for Calculating your Home Office Working Hours", Retrieved from: https://www.androidpit.com/apps-for-home-office-hours, Retrieved on Mar. 18, 2020, 5 Pages.

Kushlev, et al., "Checking Email Less Frequently Reduces Stress", In Journal of Computers in Human Behavior, vol. 43, Feb. 2015, pp. 220-228.

"International Search Report and Written Opinion issued in PCT Application No. PCT/US21/023793", dated Jul. 13, 2021, 12 Pages.

\* cited by examiner

COMPUTATION OF AFTER-HOURS ACTIVITIES METRICS

TECHNICAL FIELD

The subject matter disclosed herein generally relates to a special-purpose machine that computes online activities metrics, including computerized variants of such special-purpose machines and improvements to such variants.

BACKGROUND

Measuring online activities of a user of an application can be difficult to determine given the millions of data point entries and the lack of context of computed metrics. Furthermore, the effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
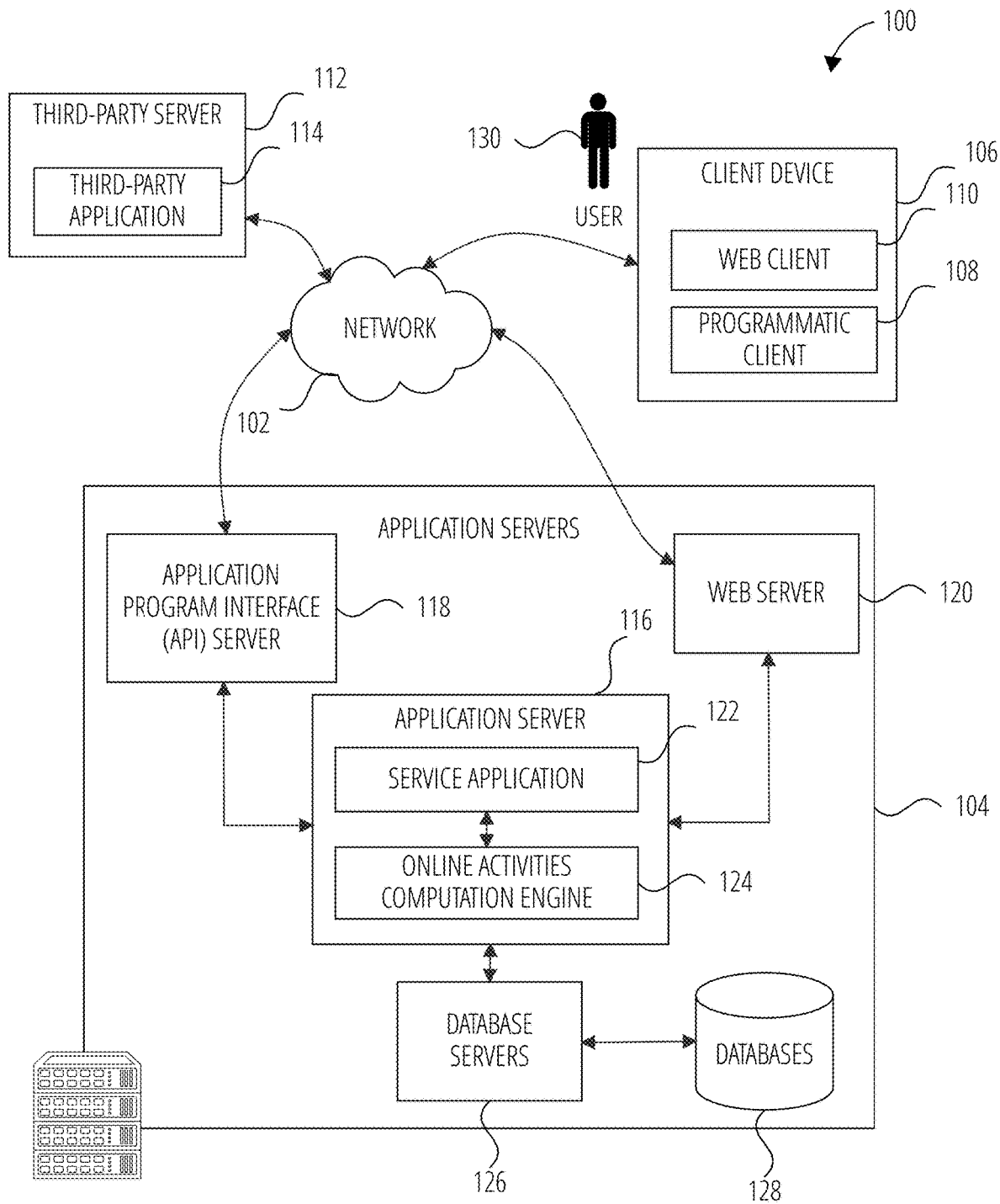
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system and a method for calculating a metric indicative of an operation of an application by a user of an enterprise and configuring the application based on the metric. An enterprise represents organizations or groups of users associated with an organization. In particular, the system provides algorithms to calculate a score representative of online after-hours activities of the user operating the application. In one example, the application is registered with the enterprise. The application can log application activities by the user in online activity data.

The system filters the online activity data based on dates and times. For example, the system filters the online activity data to include only activities that have occurred outside of typical working hours (e.g., before 9 am and after 5 pm on weekdays and all day on weekends). In another example, the system may filter based on other preset time ranges (e.g., holidays only, Sundays). The filtered online activity data may also be referred to as after-hours online activity data. In one example, the after-hours online activity data identifies the application used by the user after-hours, a type of activity of one or more applications registered with the enterprise (e.g., call, chat, meeting, reading an email, sending an email), and a duration of an activity (e.g., 5 minute chat, 10 minute meeting) that has occurred after-hours (e.g., outside the typical 9 am to 5 pm workweek hours). In another example, the system enables each user to personalize or specify their working hours in addition to the default typical working hours (e.g., 9 am to 5 pm).

The system retrieves weights/points corresponding to each type of application, type of activity, and/or a duration of the activity. For example, an after-hours voice call of more than 10 minutes via a voice network communication application may count as 4 points. Reading an email using an email application after-hours may count as 1 point. The system computes the score of a user based on the weighted activities. The system then calculates a metric (e.g., quiet hour metric) based on the score of the user. For example, the metric includes a trend of the score over the last four weeks. In another example, the metric includes a breakdown of types of activities by time over the last four weeks. In another example, the metric can include a combination of the weighted activities (e.g., after-hours load metric is based on the after-hours email time, after-hours meeting, and after-hours voice call).

The system generates a graphical user interface that includes graphical elements illustrating an after-hours score, metrics, types of activities, and duration of each type of activities of the user. The graphical user interface includes a graph illustrating a trend of the metrics for the user. In another example, the graphical user interface includes graphical elements illustrating an after-hours score, metrics, types of activities, and duration of each type of activities of other users of the same enterprise. The graphical user interface includes a graph illustrating a comparison of the metrics of the user with the other users of the enterprise. In another example, the graphical user interface includes graphical elements illustrating an after-hours score, metrics, types of activities, and duration of each type of activities of other users of the other enterprises using the same application(s). The graphical user interface includes a graph illustrating a comparison of the metrics of the users of the enterprise with the metrics of users of the other enterprises.

The system determines a configuration setting for the application of the user based on the after-hours metric of the user. For example, the system determines that an after-hours metric exceeds a threshold for a user. The system retrieves an application configuration corresponding to the threshold. The system then applies the application configuration to the settings of the application of the user. For example, the system may prevent the user from accessing a particular feature of the application on weeknights and weekend. In another example, the system identifies documents that are frequently accessed after-hours and presents those identified documents to the user the next day when the user logs into the application.

The system accesses data points from the application registered with users of the enterprise. For example, devices associated with the enterprise communicate with a remote server hosting the enterprise application. In other examples, the devices associated with the enterprise include a local copy of the enterprise application and communicate user activities of local copy to the remote server. The data points include user activities associated with the enterprise application of the enterprise. Examples of data points include dates and times of users operating the enterprise application, types of documents being accessed or shared by users of the enterprise application, users calendar data from the enterprise application, communication data between users of the enterprise application, and enterprise organization data. Examples of enterprise applications include email applications, document editing applications, document sharing applications, and other types of applications used by enterprises.

In one example embodiment, a system and method for computing a metric indicating a user operation of an application is described. The system accesses online activity data of the application operated by a user. The system filters the online activity data based on a preset time range. An after-hours activity score is calculated based on a type of activity or a duration of an activity from the filtered online activity data, and a weight assigned to the type of activity or the duration of the activity. The system computes an after-hours metric based on the after-hours activity score. A configuration setting for the application based on the after-hours metric is applied to the application. In one example, the configuration setting is specific to the user of the application (e.g., the user associated with the online activity data of the application).

As a result, one or more of the methodologies described herein facilitate solving the technical problem of determining enterprise metrics of an enterprise application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser), a programmatic client 108 (e.g., an email/calendar application such as Microsoft Outlook (™), an instant message application, a document writing application, a shared document storage application) that is hosted and executed on the client device 106. In one example embodiment, the programmatic client 108 logs interaction data from the web client 110 and the programmatic client 108 with the service application 122. In another example embodiment, the service application 122 logs interaction data between the web client 110, the programmatic client 108, and the service application 122. The interaction data may include for example, communication logs of communications (e.g., emails) between users of an enterprise or communications between users of the enterprise and outside users of the enterprise. Other examples of interaction data include and are not limited to email communications, meeting communications, instant messages, shared document comments, and any communication with a recipient (e.g., a user from or outside the enterprise).

An Application Program Interface (API) server 118 and a web server 120 provide respective programmatic and web interfaces to application servers 104. A specific application server 116 hosts the service application 122 and an online activities computation engine 124. Both service application 122 and online activities computation engine 124 include components, modules and/or applications.

The service application 122 may include collaborative applications (e.g., a server side email/calendar application, a server-side instant message application, a document authoring application, a shared document storage application) that enable users of an enterprise to collaborate and share document, messages, and other data (e.g., meeting information, common projects) with each other. For example, the user 130 at the client device 106 may access the service application 122 to edit documents that are shared with other users of the same enterprise. In another example, the client device 106 accesses the service application 122 to retrieve or send messages or emails to and from other peer users of the enterprise. Other examples of service application 122 includes enterprise systems, content management systems, and knowledge management systems.

In one example embodiment, the online activities computation engine 124 communicates with the service application 122 and accesses activity data from users of the service application 122. In another example embodiment, the online activities computation engine 124 communicates with the programmatic client 108 and accesses interaction data (of after-hours activities) from the user 130 with other users of the enterprise. In one example, the web client 110 communicates with the online activities computation engine 124 and service application 122 via the programmatic interface provided by the Application Program Interface (API) server 118.

The online activities computation engine 124 computes metrics based on after-hours interaction data collected by the service application 122, the web client 110, or the programmatic client 108. In one example, the online activities computation engine 124 computes after-hours user metrics based on after-hours online activities data of the user 130 of the service application 122. In another example, the online activities computation engine 124 computes after-hours user metrics based on after-hours online activities data of the other users of the same enterprise. In yet another example, the online activities computation engine 124 computes after-hours enterprise metrics based on after-hours online activities data of the other users of other enterprise(s).

In one example embodiment, the online activities computation engine 124 generates a dialog box pre-populated with information based on the recommended action (e.g., pre-filled with parameters of a feature of the service application 122). The user 130 only has to click on one button to configure the programmatic client 108 with the new parameters. For example, the pre-filled parameters configure the programmatic client 108 to prevent from retrieving or sending emails after-hours (e.g., between 10 pm and 6 am on weekdays and all day on weekends). Such configuration results in a change of in the after-hours metric of the user 130. An example embodiment of the online activities computation engine 124 is described further below with respect to FIG. 2.

The application server 116 is shown to be communicatively coupled to database servers 126 that facilitates access to an information storage repository or databases 128. In an example embodiment, the databases 128 includes storage devices that store information to be processed by the service application 122 and the online activities computation engine 124.

Additionally, a third-party application 114 may, for example, store another part of the service application 122, or include a cloud storage system. For example, the third-party application 114 stores other metrics related to the other applications and other enterprises. The metrics may include size of the enterprises, industry classification, and updated revenue. The third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
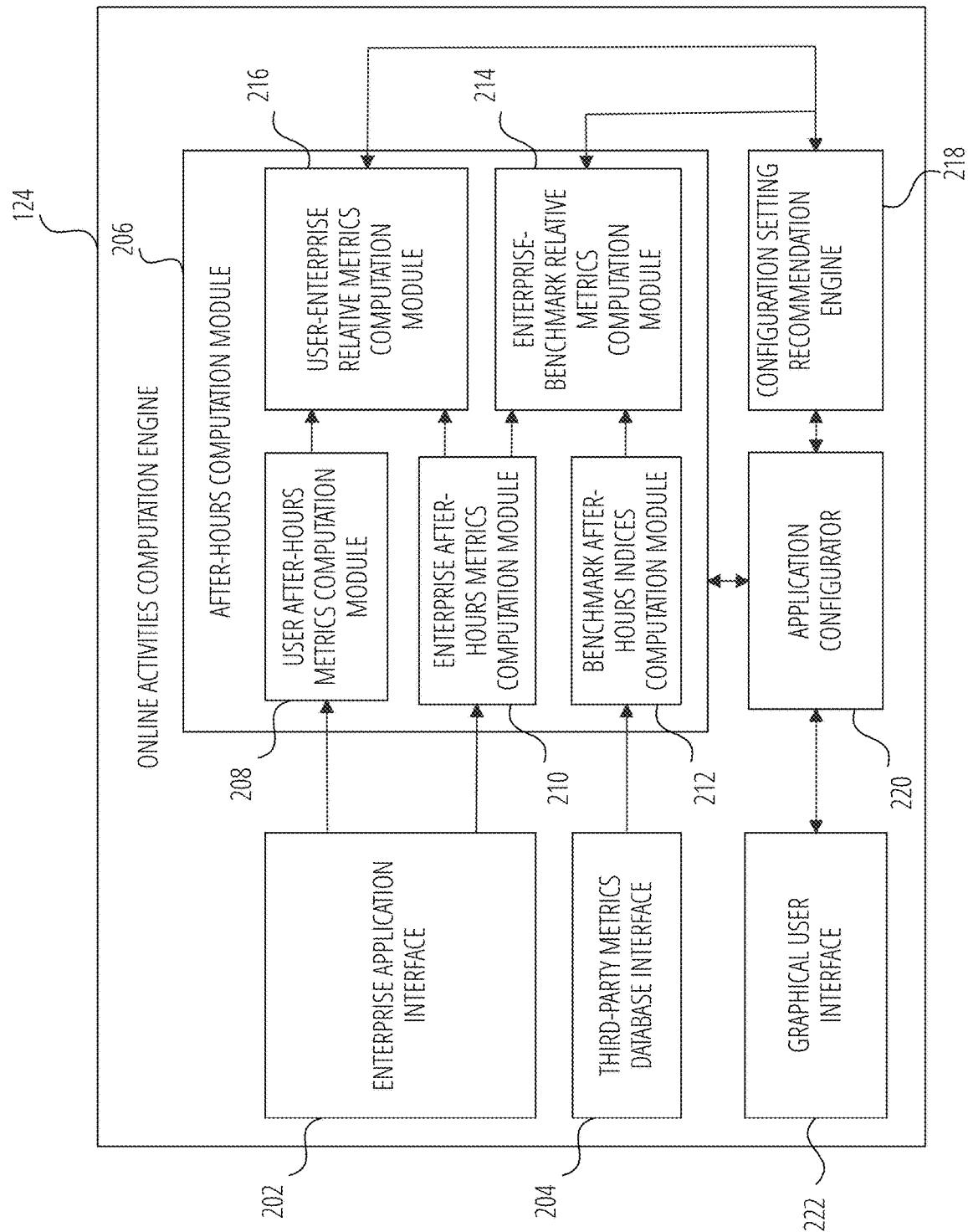
FIG. 2 is a block diagram illustrating an online activities computation engine in accordance with one example embodiment.

FIG. 2 is a block diagram illustrating an online activities computation engine in accordance with one example embodiment. The online activities computation engine 124 comprises an enterprise application interface 202, a third-party metrics database interface 204, an after-hours computation module 206, a configuration setting recommendation engine 218, and an application configurator 220.

The enterprise application interface 202 communicates with the service application 122. For example, the enterprise application interface 202 accesses application usage data of the service application 122 from client devices associated with an enterprise. The service application 122 includes a server-side application that monitors and validates operations of a client-side application (e.g., programmatic client 108). The application usage data includes data related to communication log of operations of the service application 122 from client devices of the enterprise. In another example, the service application 122 includes one or more enterprise applications (e.g., communication application, document sharing application, document editing and authoring application). The application usage data can also indicate frequency and types of interactions between a user account of the enterprise with the service application 122.

The third-party metrics database interface 204 communicates with the service application 122. For example, the third-party metrics database interface 204 accesses application usage data of the service application 122 from client devices associated with other enterprises. The service application 122 includes a server-side application that monitors and validates operations of a client-side application (e.g., programmatic client 108) installed on client devices associated with other enterprises. The application usage data includes data related to communication log of operations of the service application 122 from client devices of the other enterprises. In another example embodiment, the third-party metrics database interface 204 communicates with the third-party server 112 to access application usage data or metrics related to user operations of the service application 122 by users of other enterprises.

The after-hours computation module 206 comprises a user after-hours metrics computation module 208, an enterprise after-hours metrics computation module 210, a benchmark after-hours indices computation module 212, an enterprise-benchmark relative metrics computation module 214, and a user-enterprise relative metrics computation module 216. The user after-hours metrics computation module 208 and the enterprise after-hours metrics computation module 210 are coupled to the user-enterprise relative metrics computation module 216. The enterprise after-hours metrics computation module 210 and the benchmark after-hours indices computation module 212 are coupled to the enterprise-benchmark relative metrics computation module 214.

The user after-hours metrics computation module 208 computes after-hours metrics related to the user 130 based on online user activities (e.g., application usage data) of the user 130 (of an enterprise) operating on the service application 122 (via web client 110 or programmatic client 108) associated with the enterprise during after-hours (e.g., 9 am and after 5 pm on weekdays and all day on weekends).

Examples of metrics include:
quiet day metric/score (e.g., a metric that counts a day as quiet when a score based on after-hours activities does not exceed a threshold),
after-hours load metric (e.g., a metric that measures after-hours email time, after-hours meetings, after-hours chats, and after-hours calls),
after-hours mobile interruptions (e.g., a metric that measures after-hours email activity on a mobile device),
after-hours root cause (e.g., a metric that identifies a significant cause of after-hours time),
after-hours top collaborator (e.g., a metric that identifies user(s) most often interacted with after-hours),
after-hours impact email (e.g., a metric that measures a user's impact of email during after-hours on a recipient),
after-hours impact meeting (e.g., a metric that measures a user's impact of email during after-hours on a recipient),
after-hours timeframe (e.g., a metric that measures actual or true working hours of a user),
after-hours control (e.g., a metric that measures the percentage of after-hours activities that are within control of a user).

It is noted that the metrics are not limited to the above examples and that other metrics can be measured based on the after-hours user activities. An example embodiment of the user after-hours metrics computation module 208 is described in more detail below with response to FIG. 3.

The enterprise after-hours metrics computation module 210 computes metrics based on online user activities (e.g., application usage data) of other users of the same enterprise (as user 130) operating on the service application 122 associated with the enterprise during after-hours (e.g., before 9 am and after 5 pm on weekdays and all day on weekends). The enterprise after-hours metrics computation module 210 may calculate the same metrics as the user after-hours metrics computation module 208 but for other users of the same enterprise.

The benchmark after-hours indices computation module 212 communicates with the third-party metrics database interface 204 and calculates metrics based on the after-hours user activity data from the data retrieved from third-party metrics database interface 204. In one example embodiment, the benchmark after-hours indices computation module 212 computes metrics based on online user activities (e.g., application usage data) of other users of the other enterprises operating on the service application 122 associated with the other enterprises during after-hours (e.g., 9 am and after 5 pm on weekdays and all day on weekends). The benchmark after-hours indices computation module 212 may calculate the same metrics as the user after-hours metrics computation module 208 but for other users of the other enterprises. In another example embodiment, the benchmark after-hours indices computation module 212 communicates with a third party database (e.g., third-party server 112) that stores periodically updated profiles of the other enterprises (e.g., enterprise size, revenue, industry, etc.). In one example embodiment, the third-party metrics database interface 204 retrieves the periodically updated profiles data from the third-party server 112.

Examples of metrics obtained by the third-party metrics database interface 204 include revenue, industry classification, and size classification. By using the revenue data, industry classification, and size classification, the benchmark after-hours indices computation module 212 can generate benchmarks or indices for the metrics based on other enterprises. In another example, the benchmarks may be based by grouping the companies with similar industry classification and size classification.

The user-enterprise relative metrics computation module 216 compares a metric from the user after-hours metrics computation module 208 for the user 130 with a same metric from the enterprise after-hours metrics computation module 210 for other users of the same enterprise. The user-enterprise relative metrics computation module 216 generates a ranking of the user 130 based on the metric comparison from the user-enterprise relative metrics computation module 216. For example, the user 130 may be in the top 10% of users (of the enterprise) with a quiet day metric exceeding a threshold score.

The enterprise-benchmark relative metrics computation module 214 compares a metric from the enterprise after-hours metrics computation module 210 for users of the enterprise with a same metric from the benchmark after-hours indices computation module 212 for users of the other enterprises. The enterprise-benchmark relative metrics computation module 214 generates a ranking of the enterprise (of the user 130) based on the metric comparison from the enterprise-benchmark relative metrics computation module 214. For example, the enterprise (of the user 130) may be in the top 20% of other enterprises with a quiet day metric exceeding a threshold score.

The configuration setting recommendation engine 218 generates a recommended configuration setting of the service application 122 for the user 130 based on one or more metrics of the user 130 relative to a threshold metric set for the user 130, a threshold metric based on a same metric from other users of the same enterprise, a threshold metric based on a same metric from other users of the other enterprises, a ranking of the user 130 relative to other users of the same enterprise, or a ranking of the user 130 relative to other users of other enterprises. For example, if the quiet day metric for the user 130 exceeds a preset threshold (e.g., the user 130's online activities are relatively still high even after-hours), the configuration setting recommendation engine 218 retrieves one or more configuration setting for the service application 122 of the user 130 on how to decrease the quiet day metric.

In one example embodiment, the configuration setting recommendation engine 218 accesses a lookup table based on the quiet day metric/score, a quiet day metric ranking of the user 130 (within the enterprise), with other users from other enterprises, or users from a team/group associated with the user 130 of the service application 122. The lookup table may specify different types of configuration settings based on the value of a margin threshold (e.g., difference between a quiet day metric for the user 130 and a quiet day metric for all users of the enterprise).

In another example embodiment, the configuration setting recommendation engine 218 applies a first configuration setting (corresponding to a first quiet day metric threshold) to the service application 122 to prevent the user 130 from operating an email application of the service application 122 between midnight and 6 am on weekdays. In another example, the configuration setting recommendation engine 218 applies a second configuration setting (corresponding to a second quiet day metric threshold) to the service application 122 to prevent the user 130 from operating an email application and a messaging application of the service application 122 between 9 pm and 6 am on weekdays. In another example, the configuration setting recommendation engine 218 applies a third configuration setting (corresponding to a third quiet day metric threshold) to the service application 122 to prevent the user 130 from operating the service application 122 between 5 pm and 9 am on weekdays and weekends. In another example, the configuration setting recommendation engine 218 applies a fourth configuration setting (corresponding to a fourth quiet day metric threshold) to the service application 122 to generate a reminder to the user 130 when the service application 122 detects online activities from the user 130 between 5 pm and 9 am on weekdays. In other examples, the configuration setting recommendation engine 218 applies a configuration setting to the service application 122 associated with the user 130 based on a combination of metrics of the user 130 from user after-hours metrics computation module 208, a user-enterprise metrics comparison for the user 130 from user-enterprise relative metrics computation module 216, and/or an enterprise relative metrics comparison for the user 130 from the enterprise-benchmark relative metrics computation module 214.

Other examples of application configuration settings include:
  identifying documents edited after-hours and caching those documents in a cache associated with the service application 122/programmatic client 108/web client 110 (for faster loading during work hours);
  identifying documents edited after-hours and suggesting those documents when the user starts the service application 122/programmatic client 108/web client 110 (the next day);
  minimizing notifications during their quiet hours (e.g., hours designated as "do not disturb" by the user or after-hours);
  delaying delivery of emails sent after-hours;
  generating reminders about holiday/Out of office/events of their colleagues in case to delay any non-urgent work communications;

for users who are spending a lot of time outside of work catching up on email, booking time for them in their working hours to catch up on work and minimize "after hour" burn out;

adjusting meeting to working hours by notifying users if meeting hours misalign with working hours and proactively find time within every user's working hour to reschedule the meeting; and providing a plan for a user to enroll to "automatically" assist the user as compared to waiting for their input. For example, a user can enroll in an email delay delivery plan which will automatically deliver outbound emails such that his/her colleagues see his/her emails during their working hours only.

The application configurator 220 applies the configuration setting from configuration setting recommendation engine 218 to the corresponding application (e.g., service application 122, web client 110, programmatic client 108) associated with the user 130. In another example, the application configurator 220 generates a function call to an application (e.g., email application) corresponding to the configuration setting recommended by the configuration setting recommendation engine 218. For example, if the user 130 accepts the email configuration setting recommended by the configuration setting recommendation engine 218, the application configurator 220 launches the email application (e.g., programmatic client 108) at the client device 106 of the user 130 and applies the email configuration setting to the email application.

The graphical user interface 222 generates a graph that indicates the metrics for the user 130 as computed by the user after-hours metrics computation module 208, the user-enterprise relative metrics computed by the user-enterprise relative metrics computation module 216, the enterprise-benchmark relative metrics as computed by the enterprise-benchmark relative metrics computation module 214, the application configuration settings as recommended by the configuration setting recommendation engine 218. An example of a graph is described below with respect to FIG. 9.

Figure 3:
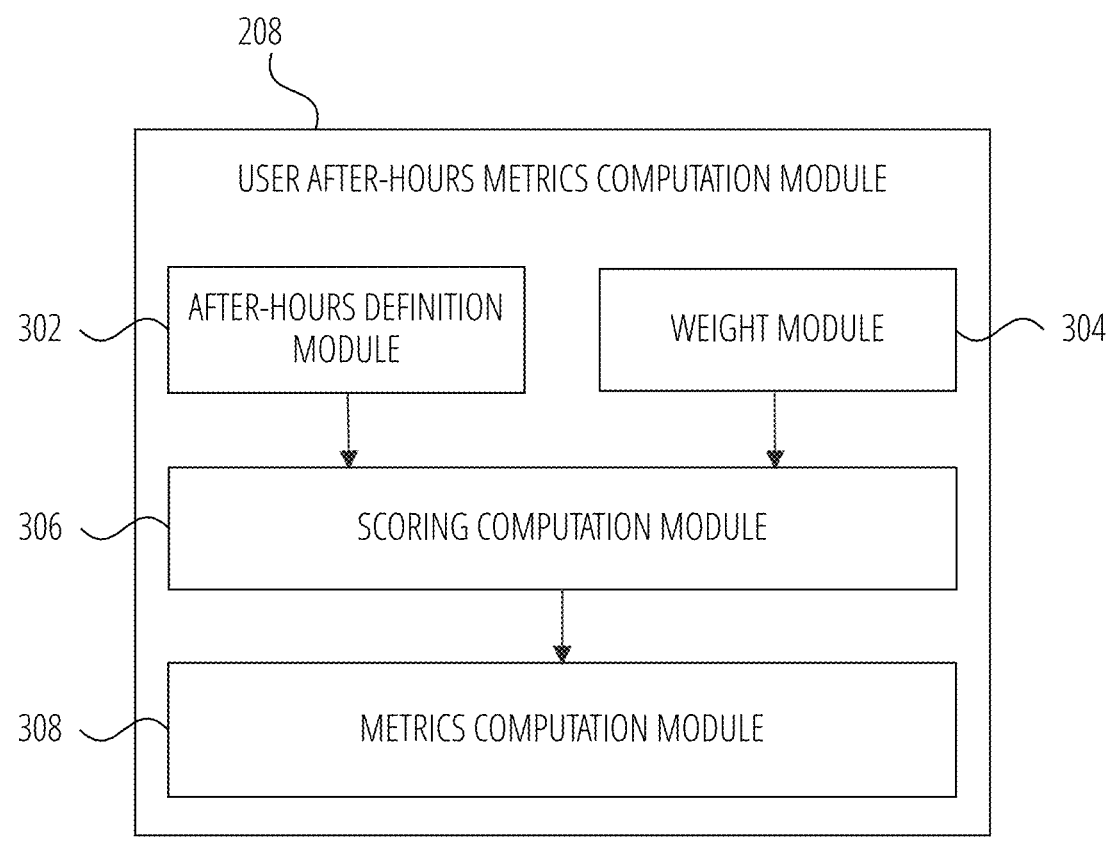
FIG. 3 is a block diagram illustrating a user after-hours metrics computation module in accordance with one example embodiment.

FIG. 3 is a block diagram illustrating a user after-hours metrics computation module in accordance with one example embodiment. The user after-hours metrics computation module 208 comprises an after-hours definition module 302, a weight module 304, a scoring computation module 306, and a metrics computation module 308.

The after-hours definition module 302 accesses after-hours metric definitions. Examples of after-hours definitions include:

quiet day metric/score (e.g., a metric that counts a day as quiet when a score based on after-hours activities does not exceed a threshold).

after-hours load metric (e.g., a metric that measures after-hours email time, after-hours meetings, after-hours chats, and after-hours calls), after-hours mobile interruptions (e.g., a metric that measures after-hours email activity on a mobile device), after-hours root cause (e.g., a metric that identifies a significant cause of after-hours time), after-hours top collaborator (e.g., a metric that identifies user(s) most often interacted with after-hours), after-hours impact email (e.g., a metric that measures a user's impact of email during after-hours on a recipient), after-hours impact meeting (e.g., a metric that measures a user's impact of email during after-hours on a recipient), after-hours timeframe (e.g., a metric that measures actual or true working hours of a user), after-hours control (e.g., a metric that measures the percentage of after-hours activities that are within control of a user).

The weight module 304 assigns a weight/points based on a duration and/or type of activity. For example, the quiet day metric is computed on a calendar day. An example threshold for identifying an impacted day is when the score exceeds at least 2 points within one hour threshold. For example, the following illustrates examples of weights/points:

Send Mails: 2 Points

Read Mails: 1 Points

Meeting: 4 points (only meetings more than 10 minutes)

Chats: 2 points/5 minutes (only send messages, read messages are ignored)

Call: 4 points (only calls more than 10 minutes, including voice network-based calls).

In another example embodiment, the weight may be assigned based on a further specific type of activity (e.g., 1 points for reading a chat message, 2 points for sending a chat message).

The scoring computation module 306 determines the number/duration/frequency of activities based on metrics definitions from after-hours definition module 302 and assigns a weight based on the weight module 304. For example, the after-hours activities of the user 130 include sending an email at 6 pm and attending a meeting at 6:30 pm. The score for the quiet day metric for the hour (6 pm to 7 pm) is 6 points (e.g., 2 points for sending an email +4 points for meeting from 6:30 pm-7 pm). As such, the hour is impacted but is still below a threshold of 2 hours within the hour.

In another example, the scoring computation module 306 computes a score for every hour (that take place after-hours). In another example, the scoring computation module 306 computes a cumulative score based on activities during every hour (that take place after-hours for a weekday, a week, or any other timeframe).

The metrics computation module 308 computes a metric based on the activities, types of activities, durations of each type of activities that take place after-hours. In one example, the metrics computation module 308 computes a metric based on the score from the scoring computation module 306. In another example, the metrics computation module 308 computes the following one or more of the following example metrics:

quiet day metric/score (e.g., a metric that counts a day as quiet when a score based on after-hours activities does not exceed a threshold).

after-hours load metric (e.g., a metric that measures after-hours email time, after-hours meetings, after-hours chats, and after-hours calls); the metric is triggered if any of the following is true:

Absolute: weekly average greater than 4 hours for the past 4 weeks

Benchmark: 150% greater than company average

Relatively to load: 25%+ of all collaboration time (meeting+email+messaging)

after-hours mobile interruptions metric (e.g., a metric that measures after-hours email activity on a mobile device); interruption is defined a read within 1 minute of email delivery or a reply/forward within 5 minutes of email delivery. This metric is based on user activity was from a mobile client. The metric is triggered if any of the following is true:

Absolute: Weekly interruptions average greater than 5
Absolute: Average nights with 1+ interruptions in a week is over 3 days
Relative to load: 40%+ of after-hours email reads and sent are interruptions after-hours root cause metric (e.g., a metric that identifies a significant cause of after-hours time); after-hours email, after-hours meeting, after-hours chats & calls. The metric is triggered if any of the following is true:
All values are above 10 minutes (4 week rolling average)
Range between smallest and largest area are at least 30 minutes different after-hours top collaborator metric (e.g., a metric that identifies user(s) most often interacted with after-hours); the metric is triggered based on both of the following being true:
Top collaborator (top ranking (above a preset threshold score) for collaboration activity time working on shared documents, attending meetings, communications)
After-hours total time in collaboration is at least 60 minutes a week after-hours impact email metric (e.g., a metric that measures a user's impact of email during after-hours on a recipient), the metric is based on:
For starters of email thread:
Score (Afterhours Email Impact)=2.5 minutes* [Count(after-hours Recipients)+Count(Direct after-hours Responses)+Count(Additional after-hours Responses)]
For other users:
Score (Afterhours Email Impact)=2.5 minutes* [Count(after-hours Recipients)+Count(Direct after-hours Responses)]
The triggers for the after-hours impact email metric include:
[Significant impact] Either one must be true:
After hours impact greater than 1.5 hour per week for the past 4 weeks
At least 3 different after hour direct responses from user's after-hours email & after-hours impact greater than 1 hour per week for the past 4 weeks
[Congratulations]
After hours impact has trended down within the past 4 weeks and absolute decrease is greater than 2 hours after-hours impact meeting metric (e.g., a metric that measures a user's impact of email during after-hours on a recipient); the metric is based on:
User organized & is marked as busy
Not all-day meeting
Attendee <12 people
For each attendee that accepted, the metric adds up the duration of the meeting that occurred in the attendee's after-hours including users who have joined the meeting; the units of this metric is person-hours.

after-hours timeframe metric (e.g., a metric that measures actual or true working hours of a user); for each working day:
Before work as the 3-hour time period before working hours
Right after work as the 3-hour time period after working hours
"Night" as the 3-8 hours after working hours
Weekend as the non-working days after-hours control metric (e.g., a metric that measures the percentage of after-hours activities that are within control of a user); There are three components to after-hours control metric:
Email: Email control is the % of email actions that the user does in their after-hours that is within their "control".
Total actions=emails the user read+emails the user sent
% control=(Email control actions)/(Total actions)
Email control actions=
Reads and sends in new threads started in the user's after hours
Reads and sends in threads where mail was first received in the user's working hours
Reads and sends in threads where the action was in responses to an after-hours interruption.
Meeting:
After hours Meeting hours that the user organizes.
Chats & calls:
message chats the user originates.

Figure 4:
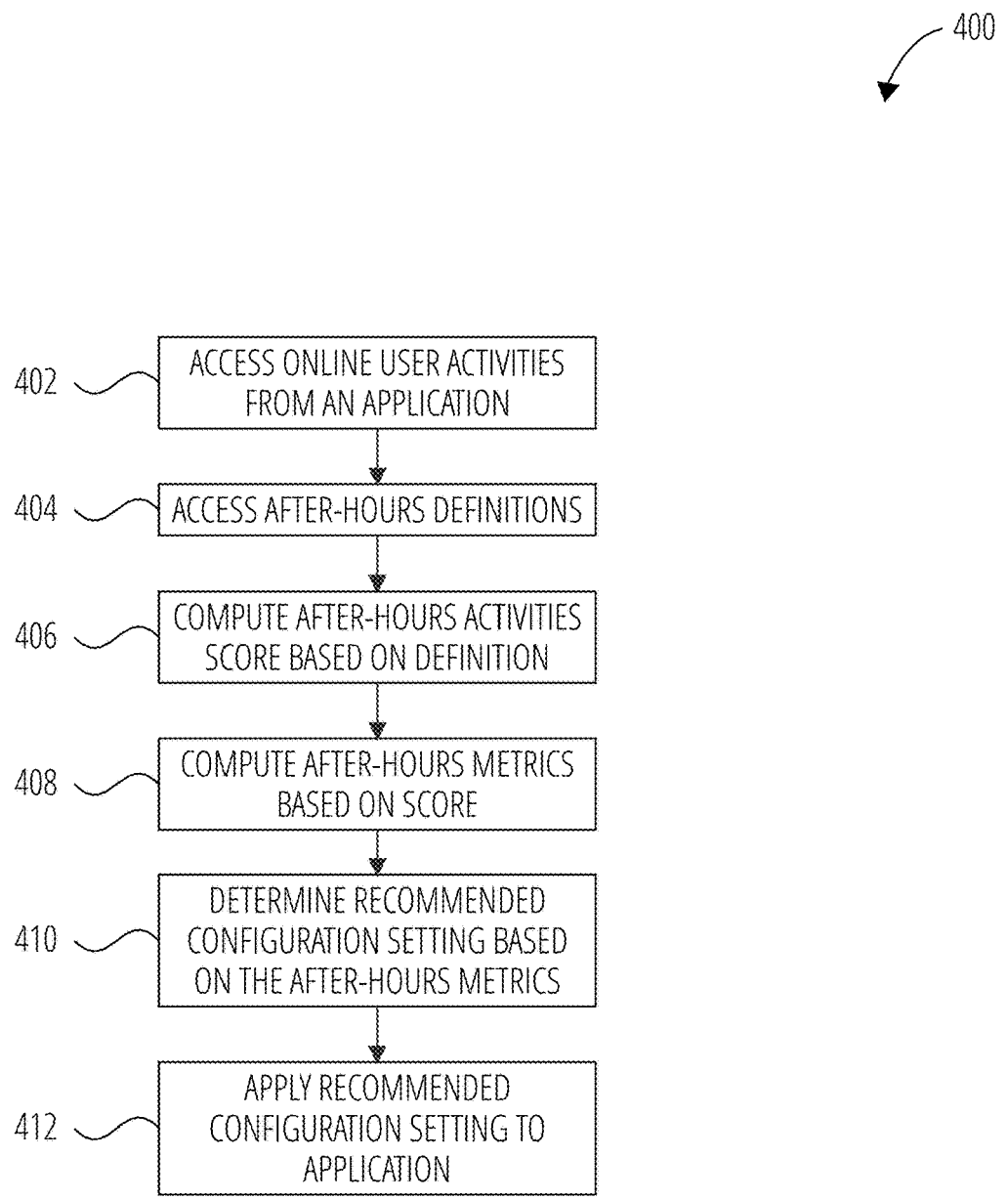
FIG. 4 is a flow diagram illustrating a method for determining a recommended configuration setting in accordance with one example embodiment.

FIG. 4 is a flow diagram illustrating a method 400 for determining a recommended configuration setting in accordance with one example embodiment. Operations in the method 400 may be performed by the online activities computation engine 124, using components (e.g., modules, engines) described above with respect to FIG. 2. Accordingly, the method 400 is described by way of example with reference to the online activities computation engine 124. However, it shall be appreciated that at least some of the operations of the method 400 may be deployed on various other hardware configurations or be performed by similar components residing elsewhere. For example, some of the operations may be performed at the client device 106.

At block 402, the user after-hours metrics computation module 208 accesses online user activities from the service application 122. At block 404, the user after-hours metrics computation module 208 accesses after-hours definitions from database servers 126. At block 406, the user after-hours metrics computation module 208 computes after-hours activities score based on the definitions. At block 408, the user after-hours metrics computation module 208 computes after-hours metrics based on the score. At block 410, the configuration setting recommendation engine 218 determines a recommended configuration setting based on the after-hours metrics. At block 412, the application configurator 220 applies the recommended configuration setting to the service application 122 (for the user 130).

Figure 5:
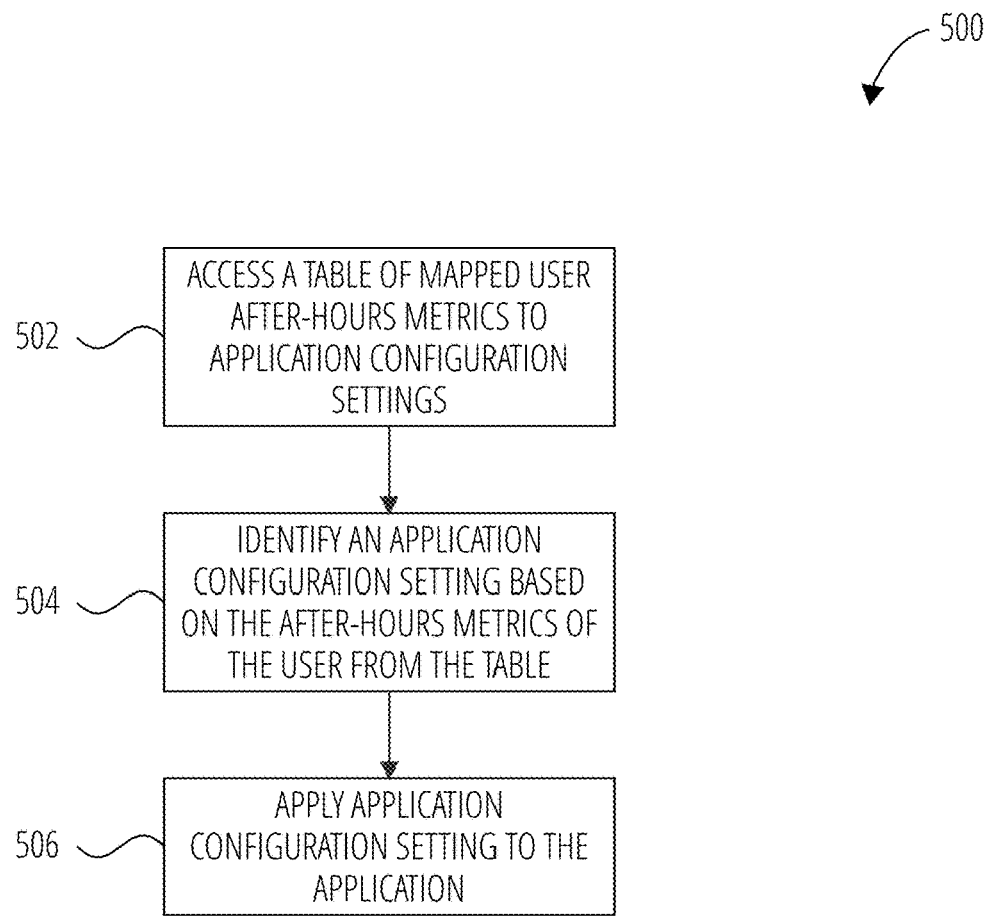
FIG. 5 is a flow diagram illustrating a method for identifying an application configuration setting in accordance with one example embodiment.

FIG. 5 is a flow diagram illustrating a method for identifying an application configuration setting in accordance with one example embodiment. Operations in the method 500 may be performed by the online activities computation engine 124, using components (e.g., modules, engines) described above with respect to FIG. 2. Accordingly, the method 500 is described by way of example with reference to the online activities computation engine 124. However, it shall be appreciated that at least some of the operations of the method 500 may be deployed on various other hardware configurations or be performed by similar components residing elsewhere. For example, some of the operations may be performed at the client device 106.

At block 502, the configuration setting recommendation engine 218 accesses a table of mapped user after-hours metrics to application configuration settings. At block 504, the configuration setting recommendation engine 218 identifies an application configuration setting based on the after-hours metrics of the user from the table. At block 506, the application configurator 220 applies the application configuration setting to the service application 122

Figure 6:
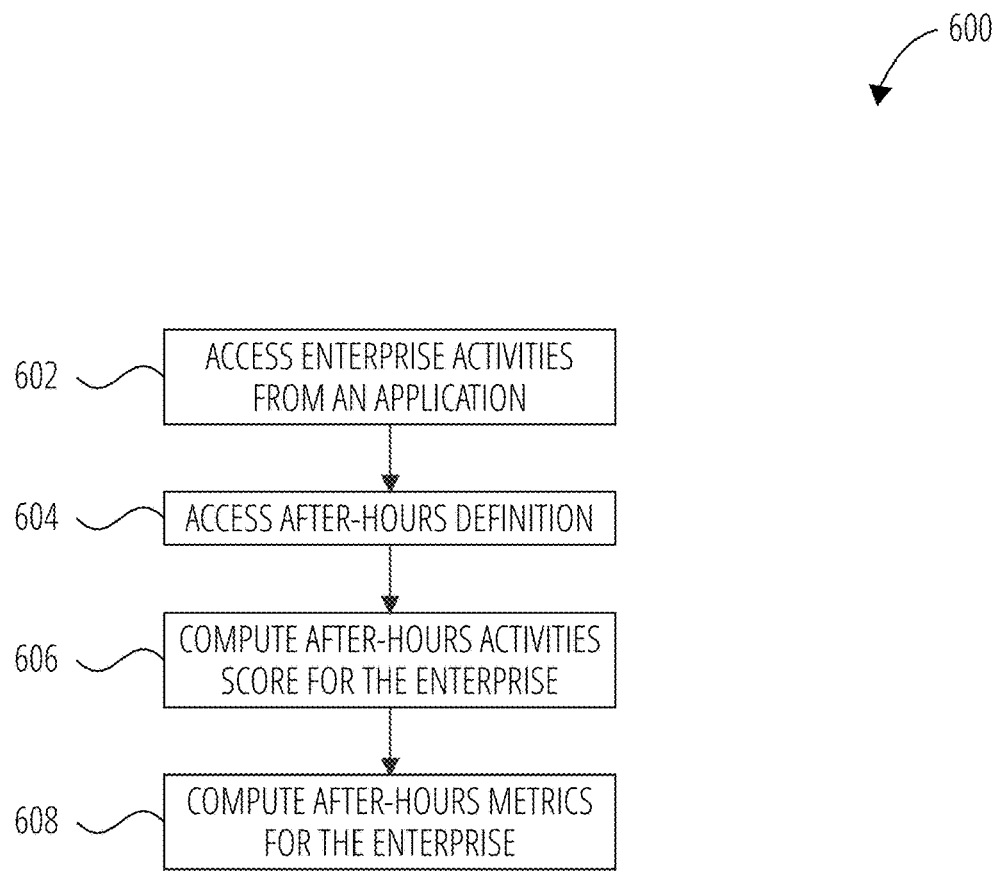
FIG. 6 is a flow diagram illustrating a method for computing after-hours metrics in accordance with one example embodiment.

FIG. 6 is a flow diagram illustrating a method for computing after-hours metrics in accordance with one example embodiment. Operations in the method 600 may be performed by the online activities computation engine 124, using components (e.g., modules, engines) described above with respect to FIG. 2. Accordingly, the method 600 is described by way of example with reference to the online activities computation engine 124. However, it shall be appreciated that at least some of the operations of the method 600 may be deployed on various other hardware configurations or be performed by similar components residing elsewhere. For example, some of the operations may be performed at the client device 106.

At block 602, the user after-hours metrics computation module 208 accesses aggregate enterprise performance metrics (e.g., enterprise application usage data). At block 604, the user after-hours metrics computation module 208 accesses a third party metrics data (e.g., financial data, enterprise profile) from a third party metrics database. At block 606, the user after-hours metrics computation module 208 computes performance benchmark metrics by industry and size based on the aggregate enterprise performance metrics and the third party metrics data. At block 608, the user after-hours metrics computation module 208 periodically updates the performance benchmarks based on updated third party metrics data and updated aggregate enterprise performance metrics.

Figure 7:
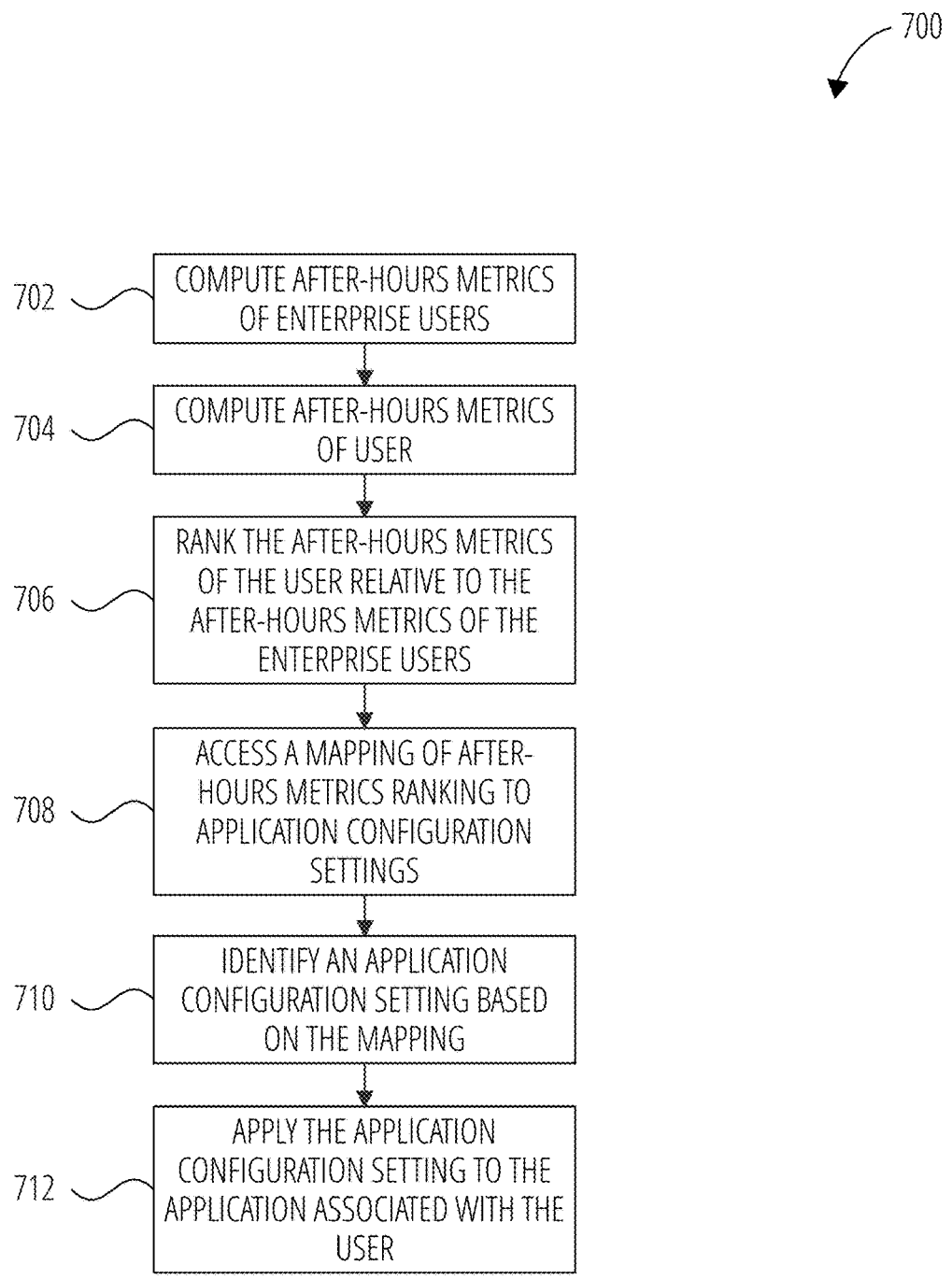
FIG. 7 is a flow diagram illustrating a method for identifying an application configuration setting based on a mapping in accordance with one example embodiment.

FIG. 7 is a flow diagram illustrating a method for identifying an application configuration setting based on a mapping in accordance with one example embodiment. Operations in the method 700 may be performed by the online activities computation engine 124, using components (e.g., modules, engines) described above with respect to FIG. 2. Accordingly, the method 700 is described by way of example with reference to the online activities computation engine 124. However, it shall be appreciated that at least some of the operations of the method 700 may be deployed on various other hardware configurations or be performed by similar components residing elsewhere. For example, some of the operations may be performed at the client device 106.

At block 702, the enterprise after-hours metrics computation module 210 computes after-hours metrics of users of an enterprise. At block 704, the user after-hours metrics computation module 208 computes after-hours metrics of the user 130. At block 706, the user-enterprise relative metrics computation module 216 ranks the after-hours metrics of the user 130 relative to the after-hours metrics of the enterprise users. At block 708, the configuration setting recommendation engine 218 accesses a mapping of after-hours metrics ranking to application configuration settings. At block 710, the configuration setting recommendation engine 218 identifies an application configuration setting based on the mapping. At block 712, the application configurator 220 applies the application configuration setting to the service application 122 associated with the user 130.

Figure 8:
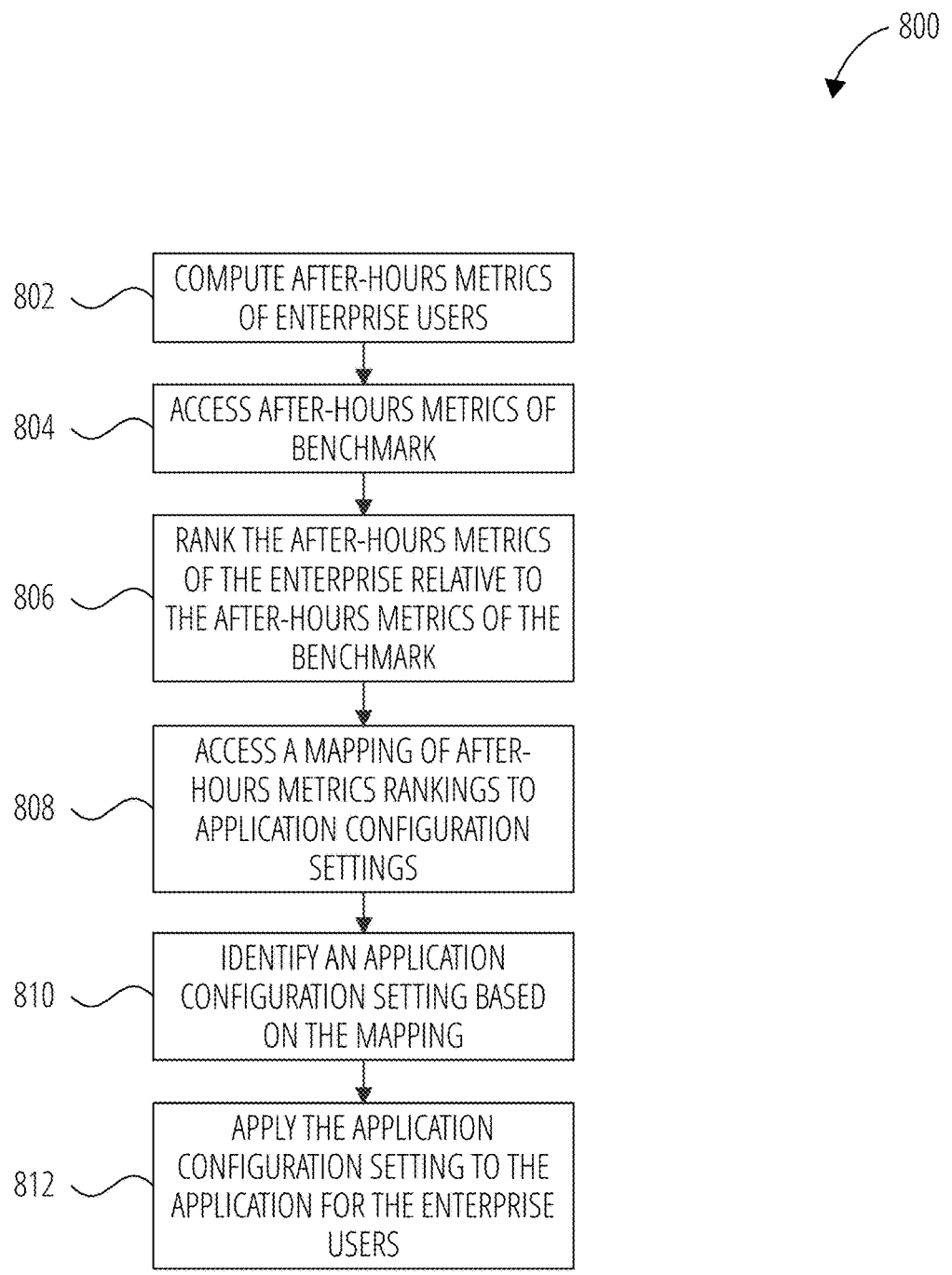
FIG. 8 is a flow diagram illustrating a method for identifying an application configuration setting based on a mapping in accordance with another example embodiment.

FIG. 8 is a flow diagram illustrating a method for identifying an application configuration setting based on a mapping in accordance with another example embodiment. Operations in the method 800 may be performed by the online activities computation engine 124, using components (e.g., modules, engines) described above with respect to FIG. 2. Accordingly, the method 800 is described by way of example with reference to the online activities computation engine 124. However, it shall be appreciated that at least some of the operations of the method 800 may be deployed on various other hardware configurations or be performed by similar components residing elsewhere. For example, some of the operations may be performed at the client device 106.

At block 802, the enterprise after-hours metrics computation module 210 computes after-hours metrics of enterprise users. At block 804, the benchmark after-hours indices computation module 212 accesses after-hours metrics of a benchmark (e.g., an average metric of other users from other enterprises). At block 806, the enterprise-benchmark relative metrics computation module 214 ranks the after-hours metrics of the enterprise relative to the after-hours metrics of the benchmark. At block 808, the configuration setting recommendation engine 218 accesses a mapping of after-hours metrics rankings to application configuration settings. At block 810, the configuration setting recommendation engine 218 identifies an application configuration setting based on the mapping. At block 812, the application configurator 220 applies the application configuration setting to the service application 122 associated with all users of the enterprise.

Figure 9:
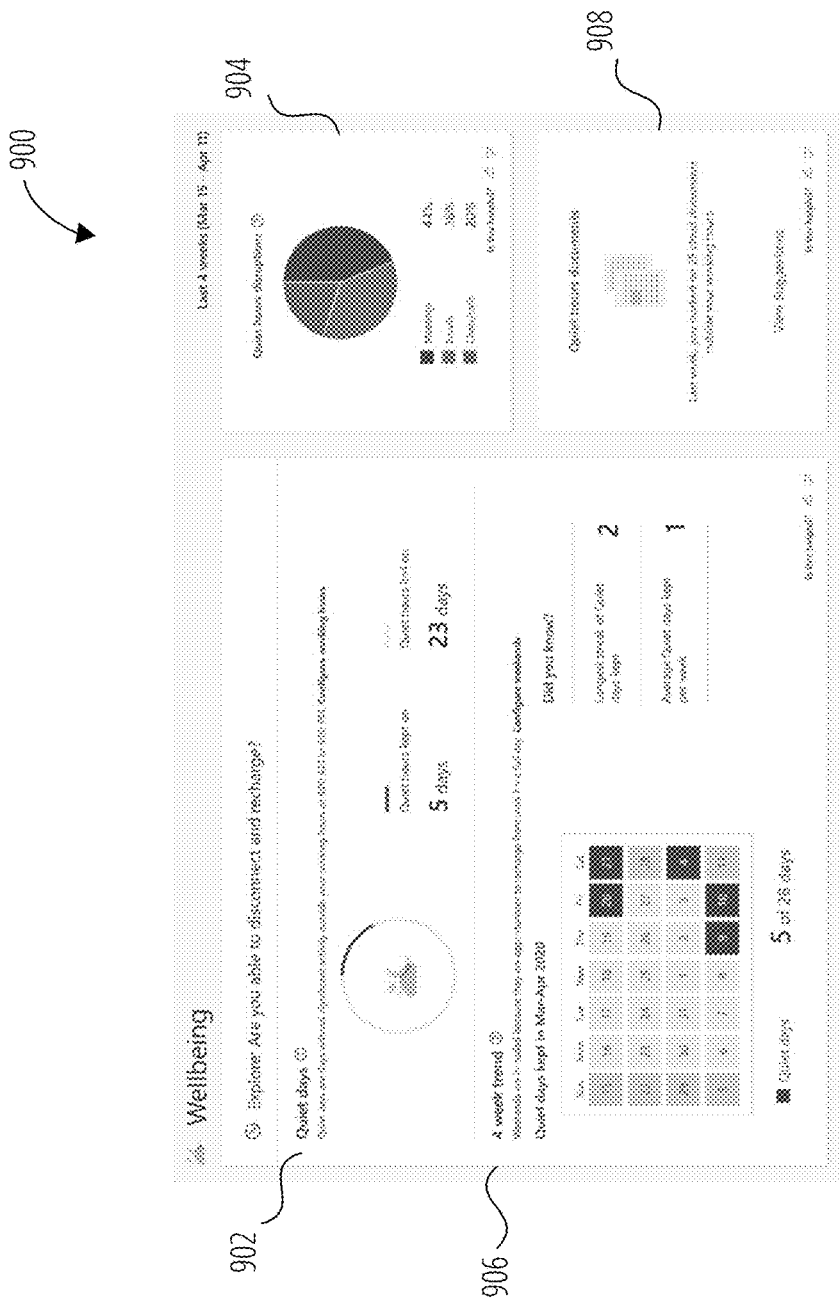
FIG. 9 illustrates an example of a graphical user interface of an after-hours metric graph in accordance with one example embodiment.

FIG. 9 illustrates a screenshot 900 of a graphical user interface indicating after-hours metrics in accordance with one example embodiment. The screenshot 900 illustrates a quiet day metric 902, quiet hours disruptions 904, four-week trend graph 906, and quiet hours documents 908. The quiet day metric 902 indicates a graph representing a streak of quiet days. The four-week trend graph 906 indicates quiet days on a calendar. The quiet hours documents 908 indicate cloud-based documents that have been edited/read/authored outside working hours.

Figure 10:
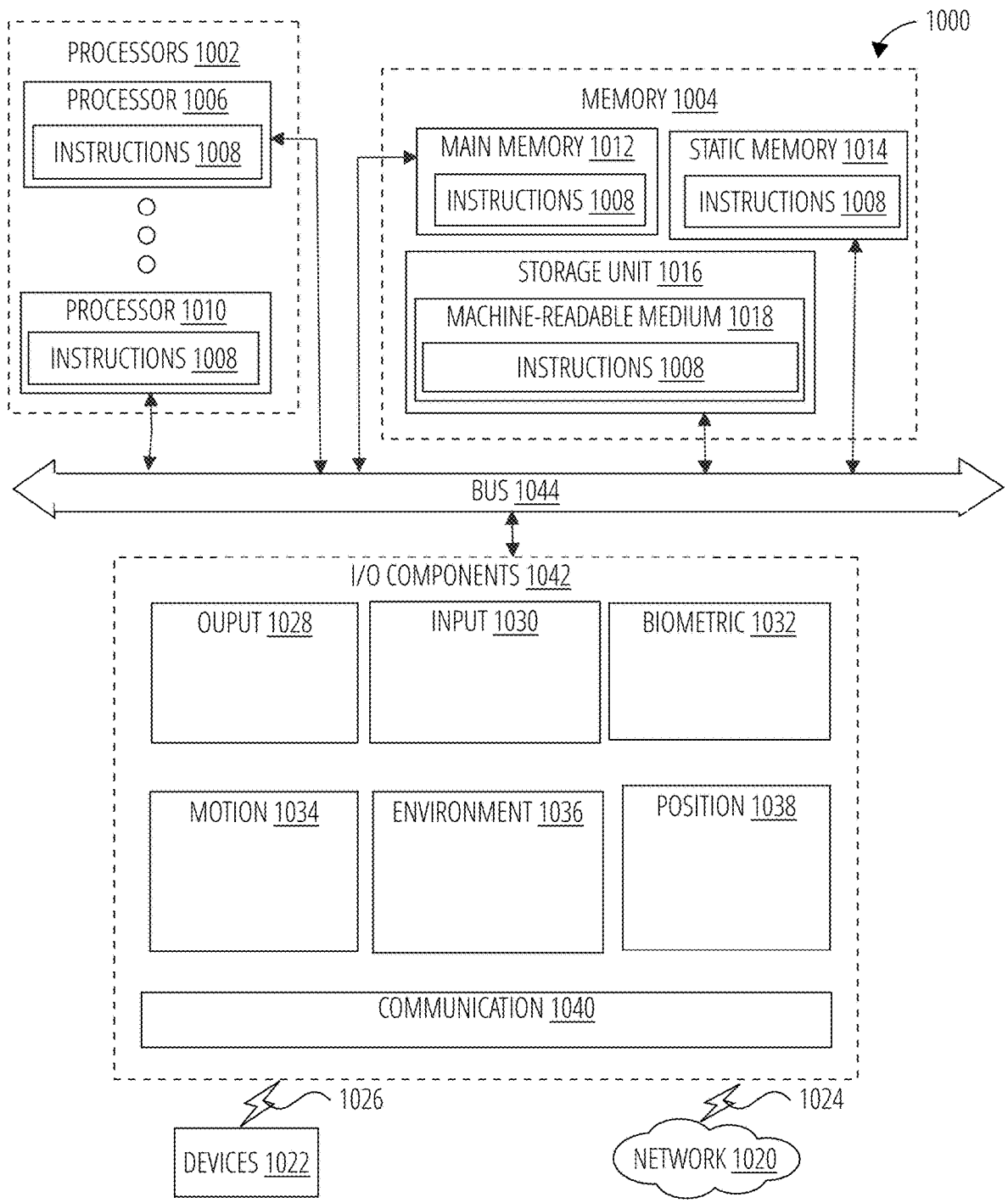
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing online activity data of a user operation of an application; filtering the online activity data based on a preset time range; computing an after-hours activity score based on a type of activity or a duration of an activity from the filtered online activity data, and a weight assigned to the type of activity or the duration of the activity; computing an after-hours metric based on the after-hours activity score; forming a configuration setting for the application based on the after-hours metric; and applying the configuration setting to the application.

Example 2 includes example 1, wherein computing the after-hours activities score further comprises: identifying a weight corresponding to the type of activity or the duration of the activity; multiplying the weight corresponding to the type of activity by the number of the type of activity in the filtered online activity data, or the weight corresponding to the duration of the activity by the duration of the activity in the filtered online activity data; and computing the after-hours activity score based on the weighted number of the type of activity or the weighted duration of the activity.

Example 3 includes any of the above examples, wherein identifying the weight further comprises: assigning a first weight to a network voice communication activity; assigning a second weight to a network messaging activity; assigning a third weight to a network meeting activity; assigning a fourth weight to reading an email activity; and assigning a fifth weight to sending an email activity.

Example 4 includes any of the above examples, wherein accessing online activity data of the user operation of the application further comprises: accessing first online activity data of a user operation of a first application; and accessing second online activity data of a user operation of a second application, wherein filtering the online activity data comprises: filtering the first and second online activity data based on the preset time range, wherein computing the after-hours activity score comprises: assigning a first weight to the first application; assigning a second weight to the second application, wherein computing the after-hours activity score further comprises: determining a first number of activities or a first duration of an activity of the first application from the filtered first online activity data; applying the first weight to the first number of activities or to the first duration of the activity of the first application; determining a second number of activities or a second duration of an activity of the second application from the filtered second online activities data; applying the second weight to the second number of activities or to the second duration of the activity of the second application; and combining the first weighted first number of activities or the first weighted duration of the activity of the first application with the second weighted second number of activities or the second weighted duration of activity of the second application.

Example 5 includes any of the above examples, wherein computing the after-hours metric comprises: calculating a combination of weighted activities from the filtered online activities data, wherein the weighted activities comprise weighted types of activities and weighted duration of activities.

Example 6 includes any of the above examples, further comprising: determining a second configuration setting for a second application based on the after-hours metric of a user of the application; and applying the second configuration setting to the second application, the second configuration setting being specific to a user of the second application, the user of the second application being the same the user of the application.

Example 7 includes any of the above examples, wherein determining the configuration setting comprises: mapping a first range of an after-hours metric to a first configuration setting; mapping a second range of the after-hours metric to a second configuration setting; determining that the after-hours metric of the user is within the first range, and wherein applying the configuration setting comprises: applying the first configuration setting to the application of the user.

Example 8 includes any of the above examples, further comprising: computing after-hours metrics of other users of the application based on the after-hours activity score of the other users, the other users and the user being part of an enterprise registered with the application; comparing the after-hours metric of the user with the after-hours metrics of the other users; determining an enterprise configuration setting based on the comparison; and applying the enterprise configuration setting to the application for the user.

Example 9 includes any of the above examples, further comprising: computing after-hours metrics of other enterprise users of the application based on the after-hours activities score of the other enterprise users, the other enterprise users being from other enterprises distinct from the enterprise of the user; comparing the after-hours metric of the user with the after-hours metrics of other enterprise users; determining an enterprise-benchmark configuration setting based on the comparison; and applying the enterprise-benchmark configuration setting to the application for the user.

Example 10 includes any of the above examples, further comprising: forming a graphical user interface that indicates the after-hours metric of the user; and causing a display of the graphical user interface at a client device of the user, wherein the online activity data indicate a type of activity of the application and a time associated with the type of activity, wherein the preset time range indicate weekends and time outside preset working hours.

Example 11 is a computing apparatus comprising: a Processor; and a memory storing instructions that, when executed by the Processor, configure the apparatus to perform operations comprising: access online activity data of a user operation of an application; filter the online activity data based on a preset time range; compute an after-hours activity score based on a type of activity or a duration of an activity from the filtered online activity data, and a weight assigned to the type of activity or the duration of the activity; compute an after-hours metric based on the after-hours activity score; form a configuration setting for the application based on the after-hours metric; and apply the configuration setting to the application.

Example 12 includes example 11, wherein computing the after-hours activities score comprises: identify a weight corresponding to the type of activity or the duration of the activity; multiply the weight corresponding to the type of activity by the number of the type of activity in the filtered online activity data, or the weight corresponding to the duration of the activity by the duration of the activity in the filtered online activity data; and compute the after-hours activity score based on the weighted number of the type of activity or the weighted duration of the activity.

Example 13 includes any of the above examples, wherein identifying the weight comprises: assign a first weight to a network voice communication activity; assign a second weight to a network messaging activity; assign a third weight to a network meeting activity; assign a fourth weight to reading an email activity; and assign a fifth weight to sending an email activity.

Example 14 includes any of the above examples, wherein accessing online activity data of the application comprises: access first online activity data of the user operation of a first application; and access second online activity data of the user operation of a second application, wherein filtering the online activity data further comprises: filter the first and second online activity data based on the preset time range, wherein computing the after-hours activity score further comprises: assign a first weight to the first application; assign a second weight to the second application, wherein computing the after-hours activity score further comprises: determine a first number of activities or a first duration of an activity of the first application from the filtered first online activity data; apply the first weight to the first number of activities or to the first duration of the activity of the first application; determine a second number of activities or a second duration of an activity of the second application from the filtered second online activities data; apply the second weight to the second number of activities or to the second duration of the activity of the second application; and combine the first weighted first number of activities or the first weighted duration of the activity of the first application with the second weighted second number of activities or the second weighted duration of activity of the second application.

Example 15 includes any of the above examples, wherein computing the after-hours metric comprises: calculate a combination of weighted activities from the filtered online activities data, wherein the weighted activities comprise weighted types of activities and weighted duration of activities.

Example 16 includes any of the above examples, wherein determining the configuration setting comprises: map a first range of an after-hours metric to a first configuration setting; map a second range of the after-hours metric to a second configuration setting; determine that the after-hours metric of the user is within the first range, and wherein applying the configuration setting further comprises: apply the first configuration setting to the application of the user.

Example 17 includes any of the above examples, wherein the instructions further configure the apparatus to: compute after-hours metrics of other users of the application based on the after-hours activity score of the other users, the other users and the user being part of an enterprise registered with the application; compare the after-hours metric of the user with the after-hours metrics of the other users; determine an enterprise configuration setting based on the comparison; and apply the enterprise configuration setting to the application for the user.

Example 18 includes any of the above examples, wherein the operations further comprise: compute after-hours metrics of other enterprise users of the application based on the after-hours activities score of the other enterprise users, the other enterprise users being from other enterprises distinct from the enterprise of the user; compare the after-hours metric of the user with the after-hours metrics of other enterprise users; determine an enterprise-benchmark configuration setting based on the comparison; and apply the enterprise-benchmark configuration setting to the application for the user.

Example 19 includes any of the above examples, wherein the operations further comprise: form a graphical user interface that indicates the after-hours metric of the user; and cause a display of the graphical user interface at a client device of the user, wherein the online activity data indicate a type of activity of the application and a time associated with the type of activity, wherein the preset time range indicate weekends and time outside preset work hours.

Example 20 is a non-transitory computer-readable storage medium, the computer-readable storage medium including instructions that when executed by a computer, cause the computer to perform operations comprising: access online activity data of a user operation of an application; filter the online activity data based on a preset time range; compute an after-hours activity score based on a type of activity or a duration of an activity from the filtered online activity data, and a weight assigned to the type of activity or the duration of the activity; compute an after-hours metric based on the after-hours activity score; form a configuration setting for the application based on the after-hours metric; and apply the configuration setting to the application.

What is claimed is:

1. A computer-implemented method comprising:
accessing online activity data of a user operation of an application;
filtering the online activity data based on a preset time range;
computing an after-hours activity score based on a type of activity or a duration of an activity from the filtered online activity data, and a weight assigned to the type of activity or the duration of the activity;
computing an after-hours metric based on the after-hours activity score;
identifying recommended parameter values of a feature of the application based on the after-hours metric;
causing, at the application, a display of a graphical user interface element that is pre-filled with the recommended parameter values;
detecting a selection of the graphical user interface element;
in response to detecting the selection of the graphical user interface element, forming a configuration setting for the application based on the after-hours metric, and the recommended parameter values of the feature of the application; and
modifying an operation of the feature of the application based on the configuration setting.

2. The computer-implemented method of claim 1, wherein computing the after-hours activities score comprises:
identifying a weight corresponding to the type of activity or the duration of the activity,
multiplying the weight corresponding to the type of activity by the number of the type of activity in the filtered online activity data, or the weight corresponding to the duration of the activity by the duration of the activity in the filtered online activity data; and
computing the after-hours activity score based on the weighted number of the type of activity or the weighted duration of the activity.

3. The computer-implemented method of claim 2, wherein identifying the weight comprises:
assigning a first weight to a network voice communication activity,
assigning a second weight to a network messaging activity;
assigning a third weight to a network meeting activity;
assigning a fourth weight to reading an email activity; and
assigning a fifth weight to sending an email activity.

4. The computer-implemented method of claim 1, wherein accessing online activity data of the user operation of the application comprises:
accessing first online activity data of a user operation of a first application; and
accessing second online activity data of a user operation of a second application,
wherein filtering the online activity data comprises:
filtering the first and second online activity data based on the preset time range,
wherein computing the after-hours activity score comprises:
assigning a first weight to the first application;
assigning a second weight to the second application,
wherein computing the after-hours activity score further comprises:
determining a first number of activities or a first duration of an activity of the first application from the filtered first online activity data;
applying the first weight to the first number of activities or to the first duration of the activity of the first application;
determining a second number of activities or a second duration of an activity of the second application from the filtered second online activities data;
applying the second weight to the second number of activities or to the second duration of the activity of the second application; and
combining the first weighted first number of activities or the first weighted duration of the activity of the first application with the second weighted second number of activities or the second weighted duration of activity of the second application.

5. The computer-implemented method of claim 1, wherein computing the after-hours metric comprises:
calculating a combination of weighted activities from the filtered online activities data,
wherein the weighted activities comprise weighted types of activities and weighted duration of activities.

6. The computer-implemented method of claim 1, further comprising:
determining a second configuration setting for a second application based on the after-hours metric of a user of the application; and
applying the second configuration setting to the second application, the second configuration setting being specific to a user of the second application, the user of the second application being the same the user of the application.

7. The computer-implemented method of claim 1, wherein determining the configuration setting comprises:
mapping a first range of an after-hours metric to a first configuration setting;
mapping a second range of the after-hours metric to a second configuration setting;
determining that the after-hours metric of the user is within the first range, and
wherein applying the configuration setting comprises:
applying the first configuration setting to the application of the user.

8. The computer-implemented method of claim 1, further comprising:
computing after-hours metrics of other users of the application based on the after-hours activity score of the other users, the other users and the user being part of an enterprise registered with the application;
comparing the after-hours metric of the user with the after-hours metrics of the other users;
determining an enterprise configuration setting based on the comparison; and
applying the enterprise configuration setting to the application for the user.

9. The computer-implemented method of claim 1, further comprising:
computing after-hours metrics of other enterprise users of the application based on the after-hours activities score of the other enterprise users, the other enterprise users being from other enterprises distinct from the enterprise of the user;
comparing the after-hours metric of the user with the after-hours metrics of other enterprise users;
determining an enterprise-benchmark configuration setting based on the comparison; and
applying the enterprise-benchmark configuration setting to the application for the user.

10. The computer-implemented method of claim 1, further comprising:
  forming a graphical user interface that indicates the after-hours metric of the user; and
  causing a display of the graphical user interface at a client device of the user,
  wherein the online activity data indicate a type of activity of the application and a time associated with the type of activity, wherein the preset time range indicate weekends and time outside preset working hours.

11. A computing apparatus, the computing apparatus comprising:
  a processor; and
  a memory storing instructions that, when executed by the processor, configure the apparatus to perform operations comprising:
    access online activity data of a user operation of an application;
    filter the online activity data based on a preset time range;
    compute an after-hours activity score based on a type of activity or a duration of an activity from the filtered online activity data, and a weight assigned to the type of activity or the duration of the activity;
    compute an after-hours metric based on the after-hours activity score;
    identify recommended parameter values of a feature of the application based on the after-hours metric;
    cause, at the application, a display of a graphical user interface element that is pre-filled with the recommended parameter values;
    detect a selection of the graphical user interface element;
    in response to detecting the selection of the graphical user interface element, form a configuration setting for the application based on the after-hours metric, and the recommended parameter values of the feature of the application; and
    modifying an operation of the feature of the application based on the configuration setting.

12. The computing apparatus of claim 11, wherein computing the after-hours activities score further comprises:
  identify a weight corresponding to the type of activity or the duration of the activity;
  multiply the weight corresponding to the type of activity by the number of the type of activity in the filtered online activity data, or the weight corresponding to the duration of the activity by the duration of the activity in the filtered online activity data; and
  compute the after-hours activity score based on the weighted number of the type of activity or the weighted duration of the activity.

13. The computing apparatus of claim 12, wherein identifying the weight comprises:
  assign a first weight to a network voice communication activity;
  assign a second weight to a network messaging activity;
  assign a third weight to a network meeting activity;
  assign a fourth weight to reading an email activity; and
  assign a fifth weight to sending an email activity.

14. The computing apparatus of claim 11, wherein accessing online activity data of the user operation of the application comprises:
  access first online activity data of a user operation of a first application; and
  access second online activity data of a user operation of a second application,
  wherein filtering the online activity data comprises:
    filter the first and second online activity data based on the preset trine range,
    wherein computing the after-hours activity score comprises:
      assign a first weight to the first application;
      assign a second weight to the second application,
      wherein computing the after-hours activity score further comprises:
        determine a first number of activities or a first duration of an activity of the first application from the filtered first online activity data;
        apply the first weight to the first number of activities or to the first duration of the activity of the first application;
        determine a second number of activities or a second duration of an activity of the second application from the filtered second online activities data;
        apply the second weight to the second number of activities or to the second duration of the activity of the second application; and
        combine the first weighted first number of activities or the first weighted duration of the activity of the first application with the second weighted second number of activities or the second weighted duration of activity of the second application.

15. The computing apparatus of claim 11, wherein computing the after-hours metric comprises:
  calculate a combination of weighted activities from the filtered online activities data,
  wherein the weighted activities comprise weighted types of activities and weighted duration of activities.

16. The computing apparatus of claim 11, wherein determining the configuration setting comprises:
  map a first range of an after-hours metric to a first configuration setting;
  map a second range of the after-hours metric to a second configuration setting;
  determine that the after-hours metric of the user is within the first range, and
  wherein applying the configuration setting further comprises:
    apply the first configuration setting to the application of the user.

17. The computing apparatus of claim 11, wherein the instructions further configure the apparatus to:
  compute after-hours metrics of other users of the application based on the after-hours activity score of the other users; the other users and the user being part of an enterprise registered with the application;
  compare the after-hours metric of the user with the after-hours metrics of the other users;
  determine an enterprise configuration setting based on the comparison; and
  apply the enterprise configuration setting to the application for the user.

18. The computing apparatus of claim 11, wherein the operations further comprise:
  compute after-hours metrics of other enterprise users of the application based on the after-hours activities score of the other enterprise users, the other enterprise users being from other enterprises distinct from the enterprise of the user;
  compare the after-hours metric of the user with the after-hours metrics of other enterprise users;

determine an enterprise-benchmark configuration setting based on the comparison; and apply the enterprise-benchmark configuration setting to the application for the user.

19. The computing apparatus of claim 11, wherein the operations further comprise:

form a graphical user interface that indicates the after-hours metric of the user; and cause a display of the graphical user interface at a client device of the user, wherein the online activity data indicate a type of activity of the application and a time associated with the type of activity, wherein the preset time range indicate weekends and time outside preset work hours.

20. A non-transitory computer-readable storage medium, the computer-readable storage medium including instructions that when executed by a computer, cause the computer to perform operations comprising:

access online activity data of a user operation of an application;

filter the online activity data based on a preset time range;

compute an after-hours activity score based on a type of activity or a duration of an activity from the filtered online activity data, and a weight assigned to the type of activity or the duration of the activity;

compute an after-hours metric based on the after-hours activity score;

identify recommended parameter values of a feature of the application based on the after-hours metric;

cause, at the application, a display of a graphical user interface element that is pre-filled with the recommended parameter values;

detect a selection of the graphical user interface element;

in response to detecting the selection of the graphical user interface element, form a configuration setting for the application based on the after-hours metric, and the recommended parameter values of the feature of the application; and modifying an operation of the feature of the application based on the configuration setting.

* * * * *